Sept. 30, 1930. J. G. YONKESE 1,776,877
FUEL CONTROL AND BALANCING SYSTEM
Filed March 24, 1928 5 Sheets-Sheet 1

INVENTOR
JOSEPH G. YONKESE
BY Munn & Co.
ATTORNEYS

Fig. 3

Sept. 30, 1930.    J. G. YONKESE    1,776,877
FUEL CONTROL AND BALANCING SYSTEM
Filed March 24, 1928    5 Sheets-Sheet 3

INVENTOR
JOSEPH G. YONKESE
BY Munn & Co.
ATTORNEYS

Sept. 30, 1930.  J. G. YONKESE  1,776,877

FUEL CONTROL AND BALANCING SYSTEM

Filed March 24, 1928   5 Sheets-Sheet 4

INVENTOR
JOSEPH G. YONKESE
BY Munn & Co.
ATTORNEYS

Sept. 30, 1930.   J. G. YONKESE   1,776,877
FUEL CONTROL AND BALANCING SYSTEM
Filed March 24, 1928   5 Sheets-Sheet 5

INVENTOR
JOSEPH G. YONKESE
BY Munn & Co.
ATTORNEYS

Patented Sept. 30, 1930

1,776,877

UNITED STATES PATENT OFFICE

JOSEPH G. YONKESE, OF BROOKLYN, NEW YORK

FUEL CONTROL AND BALANCING SYSTEM

Application filed March 24, 1928. Serial No. 264,519.

My invention relates to a fuel supply and balancing system particularly adapted, although not necessarily, for aircraft of the seaplane or hydroairplane type, and it is a purpose of my invention to provide a fuel supply system by which a dependable and adequate supply of fuel to the power plant or plants of the aircraft will be insured. It is a further purpose of my invention to provide a fuel supply and balancing system embodying a plurality of fuel storage tanks which are preferably disposed in the lowermost portion of the aircraft such as its hull or pontoons, so that the weight of fuel stored in the tanks will operate to materially lower the center of gravity of the aircraft and thus increase its stability, as well as permit the upper structure of the aircraft to be lightened in construction due to its being relieved of the strain which would be otherwise imposed thereon in landing in the event that the fuel was stored in elevated or wing tanks.

Another purpose of my invention is the provision of means by which fuel can be transferred from one tank of the plurality of tanks to another, so as to utilize the weight of the fuel to shift the center of gravity of the aircraft and thus obtain balancing of the latter to meet different air conditions arising during its flight or to correct an unbalancing of the airplane resulting from unequal withdrawal of fuel from the tanks.

It is still another purpose of my invention to provide means by which fuel in the plurality of tanks can be drained therefrom in an emergency such as a forced landing of the aircraft on the water; and the tanks sealed against the admission of water so that the buoyancy of the tanks can be utilized to maintain the aircraft afloat indefinitely.

In the accompanying drawing—

Referring specifically to the drawing in which similar reference characters designate similar parts in each of the several views, my invention is shown, in its present embodiment, for the purpose of illustration, associated with a hydroairplane of the biplane type, in the fuselage 10 of which is situated a power plant 11 driving a tractor propeller 12. Behind the power plant 11 is the pilot's compartment or cockpit 13 from which the pilot controls the airplane as is conventional. Directly below the fuselage is supported preferably by hollow masts 14, a pontoon 15 by which the airplane is rendered capable of landing and floating upon a body of water, all of which is well known and will be understood.

In its present embodiment my invention proposes the use of a plurality of tanks in which fuel for the power plant 11 is adapted to be stored and withdrawn to supply the demands of the power plant, or the fuel transferred from one tank to another to shift the center of gravity of the plane, or the fuel drained from the tanks and the latter sealed against the admission of water, so that the tanks will act as buoyant bodies to maintain the airplane afloat indefinitely in an emergency such as a forced landing on rough water.

The tanks are preferably disposed in the lowermost portion of the airplane which in this instance will be the pontoon 15 so that the weight of fuel contained in the tanks will serve to materially lower the center of gavity of the airplane, as well as permit the upper structure of the airplane such as the fuselage and wings thereof to be lightened in construction, due to the fact that these parts will be relieved of the strain which would be otherwise imposed thereon in landing should the fuel be stored therein.

In the present instance the fuel tanks are arranged and supported in any suitable manner in two series or rows in side by side relation within the pontoon 15, and each row is shown as comprising five tanks designated generally at 16, 17, 18, 19, and 20 reading from fore to aft of the airplane, although a greater or less number of tanks could be used, while to distinguish the numerals of one row of tanks from those of the other row, the numerals of one row are provided with exponents.

As the means for controlling the withdrawal and transfer of fuel in the tanks of one row is identical to the means for controlling the withdrawal and transfer of fuel in the tanks of the other row, a description of the control means for one row of tanks will suffice, and to distinguish identical parts of the two control means from each other, exponents will be also used for the parts of one of the control means.

The means for controlling the withdrawal and transfer of fuel in each of the two rows of tanks comprises a feed conduit 21 and a return conduit 22 situated within the pontoon 15 and extending longitudinally thereof in side by side relation. Into the feed conduit is tapped at intervals along its length, a plurality of distributing conduits 23, one for each of and extending downwardly into the tanks 16, 17, 18, 19, and 20 to a point adjacent the bottoms thereof. Into the return conduit 22 is tapped at intervals along its length, a plurality of distributing conduits 24, one for each of and communicating with the tanks 16, 17, 18, 19, and 20 at the tops thereof.

From the feed conduit 21 leads a vertical branch conduit 25 which extends upwardly through one of the hollow masts 14 to a gravity tank 26 supported within the mast at a point above the power plant 11. Interposed in the vertical branch conduit 25 is a pump 27 of conventional form capable of being driven by a motor 28 from a suitable source of current supply on the airplane (not shown) to induce suction in the feed conduit 21 and hence in its distributing conduits 23, and thus withdraw fuel from the tanks 16, 17, 18, 19, and 20 and elevate the fuel into the gravity tank 26. The vertical branch conduit 25 for one row of tanks is connected by a pipe 29 to the vertical branch conduit $25^a$ for the other row of tanks, so that both pumps 27 and $27^a$ or either pump can be employed to elevate fuel from the tanks should the other pump fail. The vertical branches 25 and $25^a$ are provided with valves 30 and $30^a$ respectively by which the flow of fuel to the gravity tank 26 can be controlled, and between the valves 30 and $30^a$ and the respective pumps 27 and $27^a$, the branches 25 and $25^a$ are connected to a common supply pipe 31 leading to the carburetor 32 of the power plant 11 so that fuel from either row or both of the tanks can be delivered by the pumps 27 and $27^a$ to the power plant, or fed to the latter by gravity from the gravity tank 26, when the pumps are shut down and the valves 30 or $30^a$ opened.

Figures 10, 11:
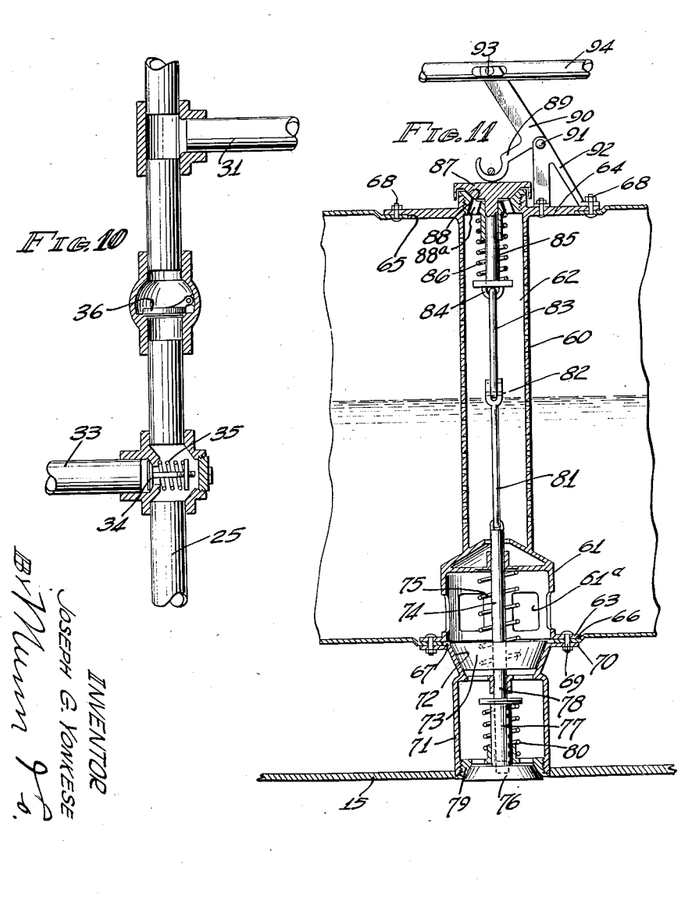
Fig. 10 is a fragmentary view illustrating relief and check valves embodied in my invention.
Figs. 11 and 12 are enlarged vertical sectional views illustrating in closed and open positions respectively, a form of drain valve embodied in my invention.

From the return conduit 22 leads a vertical branch conduit 33 which also extends upwardly through the said hollow mast 14 and is connected to the vertical branch conduit 25 at a point between the pump 27 and supply pipe 31, through the medium of a relief valve 34 normally urged to closed position by a spring 35. As the amount of fuel elevated by the pump 27 is in excess of the maximum demand for the power plant 11, a pressure will gradually be built up in the vertical branch 25 when the gravity tank is cut off or filled, and when this pressure reaches a predetermined amount, the tension of the spring 35 to maintain the relief valve 34 closed, will be overcome, and the excess fuel discharged into the return conduit 22 through its vertical branch 33, and ultimately returned to the tanks 16 to 20 inclusive through the respective distributing conduits 24. To prevent fuel which has been pumped into the gravity tank 26 from returning to the storage tanks through the feed conduits 21 and $21^a$, the vertical branches 25 and $25^a$ are provided with upwardly opening check valves 36 and $36^a$ respectively as shown in Figs. 3 and 10.

For each of the fuel storage tanks is provided a valve unit for controlling the withdrawal of fuel from and the return of fuel to the respective tank, and as the valve units of all the tanks are identical in construction, a description of one will suffice for all, reference being had particularly to Figs. 5 to 9 inclusive. Each of the valve units comprises a feed control valve 40 disposed in the respective distributing conduit 23 leading from the feed conduit 21; a return control valve 41 disposed in the respective distributing conduit 24 leading from the return conduit 22; and an air vent valve 42 disposed in a vent pipe 43 connected to the respective fuel storage tank as shown in Fig. 3. The valves 40, 41, and 42 may be of any conventional construction and for the purpose of illustration are shown of the rotary plug type, the valves 41 and 42 being shown in a single plug and the valve 40 operatively connected thereto by a shaft 44 so that upon rotation of the shaft the valves 40, 41, and 42 will be rotated as a unit. Secured to the shaft 44 is a sheave 45 over which is trained and secured an endless flexible cable 46 which extends from the sheave in two stretches trained over suitable idler pulleys 47, arranged and supported so that the cable will extend through the pontoon 15, mast 14 and into the cockpit 13 to a point convenient to the operator where the cable is trained over and secured to a sheave 48 having fixed thereto an operating lever 49 capable of being moved by the pilot to any one of the three positions designated at $a$, $b$, and $c$ in Fig. 9 to accordingly simultaneously move the three valves 40, 41, and 42 to the positions shown in Figs. 6, 7, and 8 respectively. It will be understood that the valve unit comprising the three valves 40, 41, and 42 for each of the two rows of fuel storage tanks is provided with identical means for actuating them so that ten operating levers 49, one for each of the tanks, are provided, and are arranged in two banks of five levers each as clearly shown in Fig. 3 so that the operator can actuate the valves for any one tank independently of the valves for the other tanks.

Figures 1, 2:
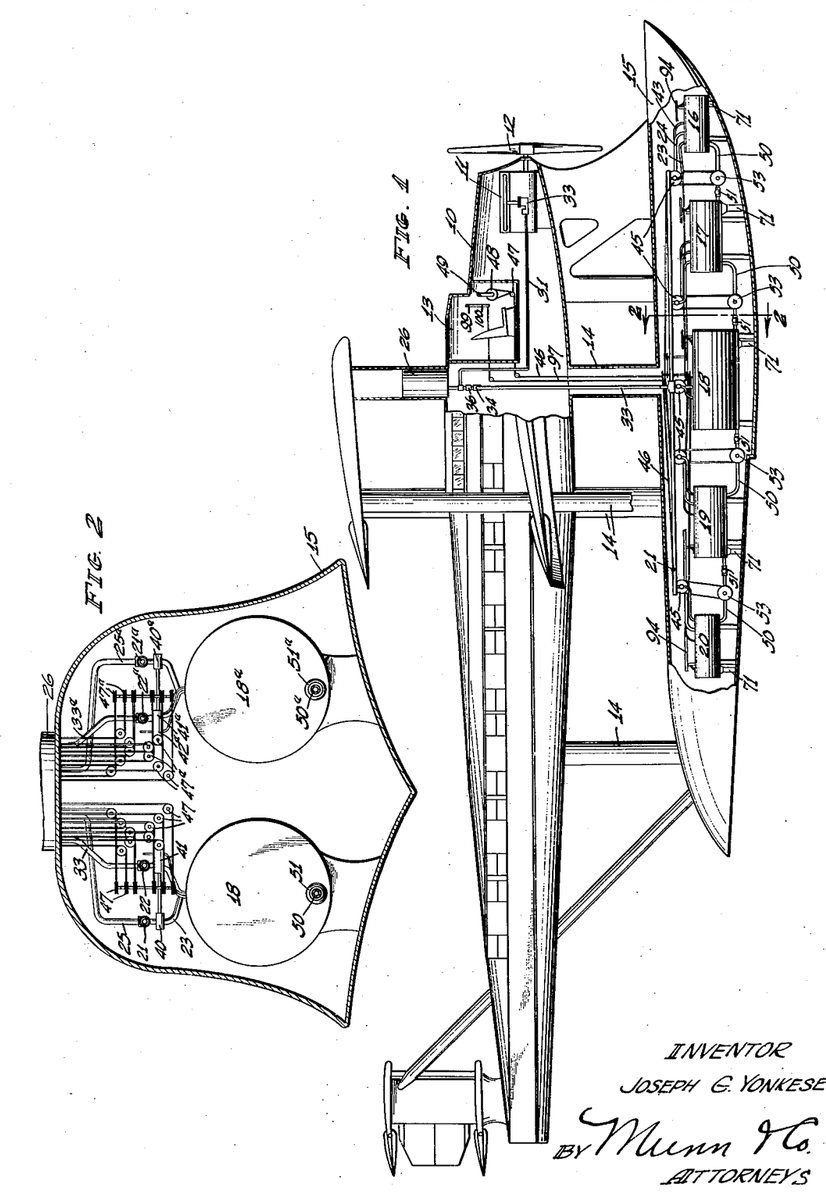
Fig. 1 is a view shown in side elevation partly broken away, of a hydroairplane with one form of fuel supply and balancing system embodying my invention applied thereto.
Fig. 2 is an enlarged detail sectional view taken on the line 2—2 of Fig. 1 and looking in the direction of the arrows.
Figure 3:
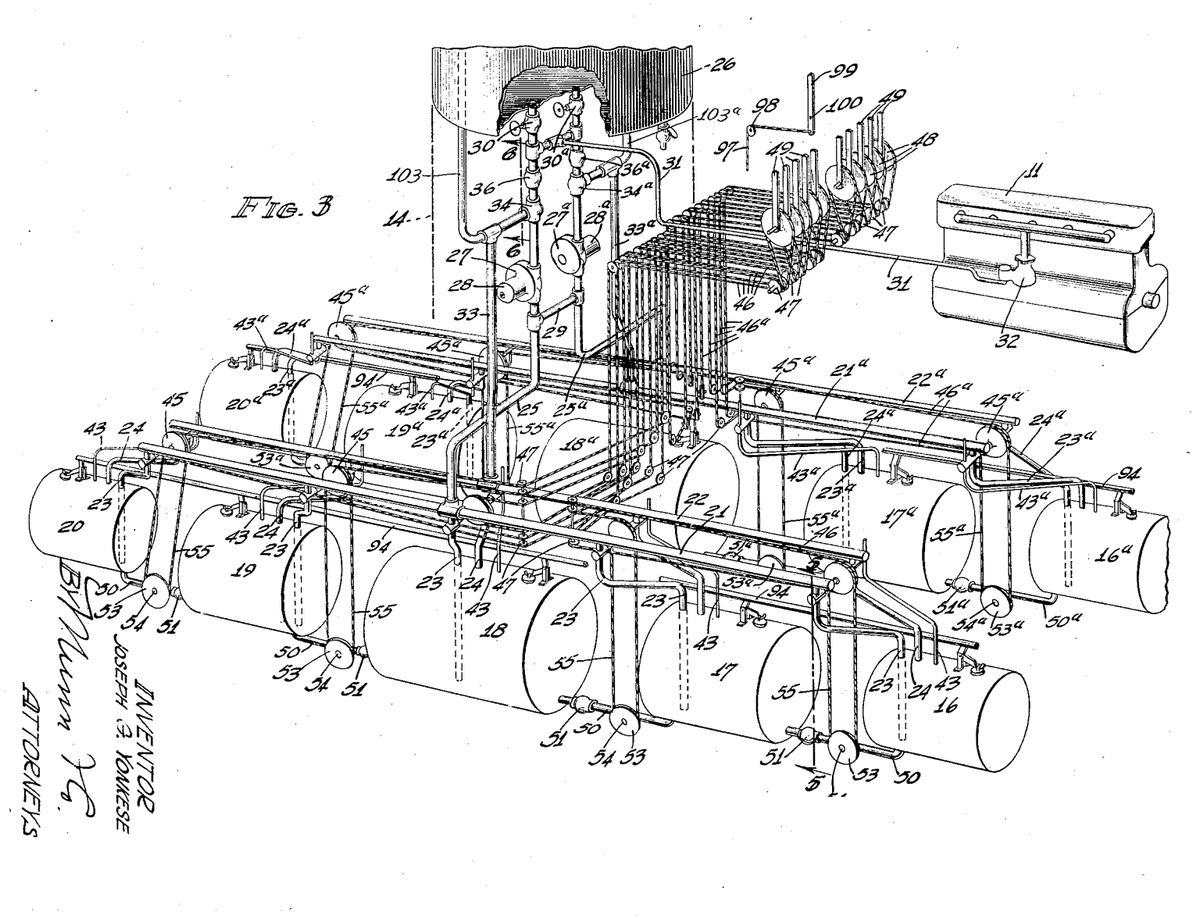
Fig. 3 is a diagrammatic perspective view illustrating the general arrangement of the parts comprised in the fuel supply and balancing system.

From a consideration of Figs. 1 and 3, it will be seen that the fuel storage tanks of the two rows are arranged at different levels, with the center tanks 18 and 18$^a$ being lowermost, the tanks 17, 17$^a$, 19, and 19$^a$ at a higher level, and the tanks 16, 16$^a$, 20, and 20$^a$ at a still higher level, and that the center tank 18 or 18$^a$ of the two rows is connected to the remaining tanks of the respective row by by-pass conduits 50 having check valves 51 therein which allow fuel to flow by gravity from one tank of the row to a lower tank but prevent the flow of fuel in the reverse direction. Furthermore, each by-pass conduit is provided with a by-pass valve 52 of which one is clearly shown in detail in Fig. 5. The by-pass valves are shown as being of the rotary plug type, and each of the by-pass valves is operatively connected to a valve unit comprising the valves 40, 41, and 42, by means of a sheave 53 secured to a shaft extension 54 of the by-pass valve, and over which is trained and secured an endless cable 55, the cable 55 being also trained over and secured to one of the sheaves 45 which is double grooved to accommodate the cable 55 as well as one of the cables 46. The corresponding positions which the by-pass valve occupies in respect to the three positions occupied by the valves 40, 41, and 42 is clearly shown in Figs. 6, 7, and 8, and the particular valve unit to which any one by-pass valve 52 is operatively connected by a sheave 53 and cable 55 is clearly shown in Fig. 3.

In the operation of the fuel supply and balancing system, let it be assumed that it is desired to withdraw fuel from the tank 18 for example, to supply the power plant 11. Assuming that the valves 40, 41, 42, and 52 for the two rows of tanks occupy the positions shown in Fig. 6, the pilot first moves the particular lever 49 for controlling the valve unit of the tank 18 to the position shown in Fig. 7 wherein the feed control valve 40 of the unit will be open; the return control valve 41 closed; and the air vent valve 42 open. With the pump 27 in operation fuel will be withdrawn from the tank 18 through the respective distributing conduit 23 to the feed conduit 21 and elevated through the vertical branch 25 to the gravity tank 26 and to the supply pipe 31 to supply the power plant 11. When the gravity tank has been filled, the surplus fuel rising in the gravity tank as a result of continued operation of the pump 27 overflows into overflow pipes 103 and 103$^a$ connected respectively to the return conduits 33 and 33$^a$. A suitable air vent is provided in the top of the gravity tank to allow free circulation of air into and out of the tank.

Figures 7, 8:
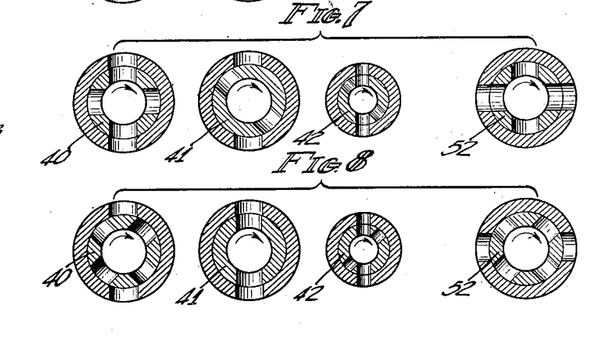

Should it be desired to withdraw fuel from any one or more of the remaining tanks 16, 17, 19, and 20 of the row, the valves 40, 41, and 42 of the valve unit for the particular tank or tanks from which it is desired to withdraw the fuel, are moved by actuating the proper lever 49 to the position shown in Fig. 7 so that the pump 27 when in operation will withdraw the fuel from the desired tank or tanks. As the capacity of the pump 27 is in excess of the amount of fuel required to supply the maximum demands of the power plant 11, the excess fuel will be returned to the return conduit 22 through the vertical branch 33, as the pressure placed on the fuel by the pump will maintain the relief valve 34 in open position. This excess fuel can be returned to any one or more of the tanks of the row except those from which it is being withdrawn, and the particular tank to which the fuel is returned will depend upon the air conditions existing during flight of the aircraft causing the craft to become nose or tail heavy, or upon the unequal withdrawal of fuel from the row of tanks causing a fore and aft unbalancing of the craft. For example, should a greater quantity of fuel have been withdrawn from the tank 16 than from the tank 20 and the craft as a consequence become tail heavy, the excess amount of the fuel being withdrawn from any one of the tanks except tank 16 and returned to the return conduit 22, can be transferred to the tank 16 by moving the proper lever 49 to actuate the valves 40, 41, and 42 of the valve unit for tank 16 to the position shown in Fig. 8 wherein the valve 40 will be closed; the valve 41 open to permit the excess fuel to return to the tank 16; and the air vent valve 42 open to permit the escape of air from the tank 16. The valves 40, 41 and 42 of the valve units for the tanks 17, 18, and 19 can be moved to the position shown in Fig. 6 so that none of the excess fuel will be returned to these tanks, and after sufficient fuel has been returned to the tank 16 to restore the fore and aft balance of the craft, the valves are again manipulated to withdraw fuel from any tank or tanks desired. Furthermore, it will be manifest that upon proper manipulation of the valves 40, 41, and 42 of the various tanks, fuel can be transferred from any tank or tanks as required to correct a fore and aft unbalanced condition of the craft.

Figure 9:
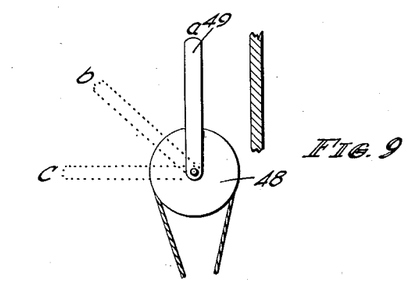
Fig. 9 is a fragmentary view illustrating a control lever for actuating the valves shown in Fig. 5.

The supply of fuel in the center tank 18 can be replenished when desired from the remaining tanks 16, 17, 19, and 20 through the by-pass conduits 50 when the by-pass valves 52 controlling the conduits are moved to the position shown in Fig. 7 by an actuation of the proper levers 49 to the position b, Fig. 9.

To provide means whereby fuel can be rapidly emptied from the two rows of storage tanks and the tanks sealed against the admission of water so that in an emergency such as a forced landing of the craft on a body of rough water, the tanks can be utilized as bouyant bodies to maintain the craft afloat, I provide the following valve mechanisms with which each storage tank of the two rows of tanks is equipped, and as all the valve mechanisms are identical in construction a description of one will suffice for all.

Figure 12:
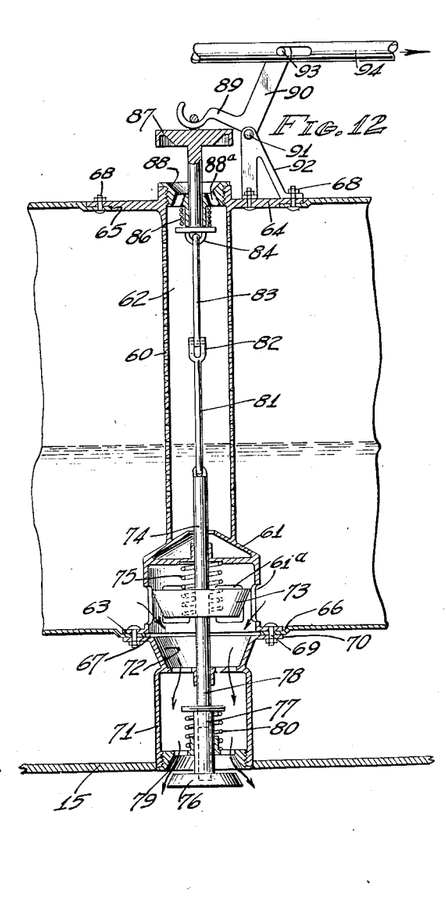

Referring particularly to Figs. 11 and 12, I have herein shown in detail one of the valve mechanisms which comprises a housing 60 including an inverted cup shaped valve body 61 having a plurality of discharge openings 61a, and from the valve body projects upwardly a tubular extension 62. The lower edge of the valve body is provided with an outwardly projecting annular flange 63 while the upper end of the extension 62 is provided with a flange 64 of larger diameter than the flange 63. The valve housing is freely insertable into the storage tank through an opening 65 in its top, to occupy the vertical position shown in Figs. 11 and 12 wherein the flange 63 rests in an annular recess 66 upon the bottom of the tank in surrounding relation to an opening 67 in the tank bottom, while the flange 64 rests in an annular recess surrounding the opening 65. The flange 64 is secured to the tank by bolts 68, while the flange 63 is secured to the tank by bolts 69 which also extend through a flange 70 formed on a drain spout 71 and so also serve to secure the spout to the tank with the discharge end of the spout opening to the underside of the pontoon as shown in Fig. 11.

The spout is constructed to provide a conical valve seat 72, and in the valve body 61 is a drain valve 73 to which is fixed a stem 74 slidably mounted in the valve body, the valve 73 being normally urged by a spring 75 into engagement with the seat 72 so as to prevent the discharge of fuel from the tank through the openings 61a and opening 72 into the spout 71.

Within the spout 71 is mounted a check valve 76 having a tubular stem 77 in which is telescopically received an extension 78 of the stem 74. The check valve 76 is normally urged into engagement with a seat 79 by means of a spring 80.

To the stem 74 of the drain valve 73 is connected a link 81 having a pin and slot connection 82 with a second link 83 connected to an eye 84 formed on the lower end of an actuating rod 85 normally urged downwardly by a spring 86 to urge a cap 87 on the upper end of the rod into sealing engagement with a seat 88 threaded into the tubular extension 62 so as to prevent admission of water into the tank. To the cap 87 is pivotally connected one arm 89 of a bell crank lever 90 pivoted at 91 on a bracket 92 secured to the flange 64 of the extension 62 as clearly shown in Fig. 11.

Figure 4:
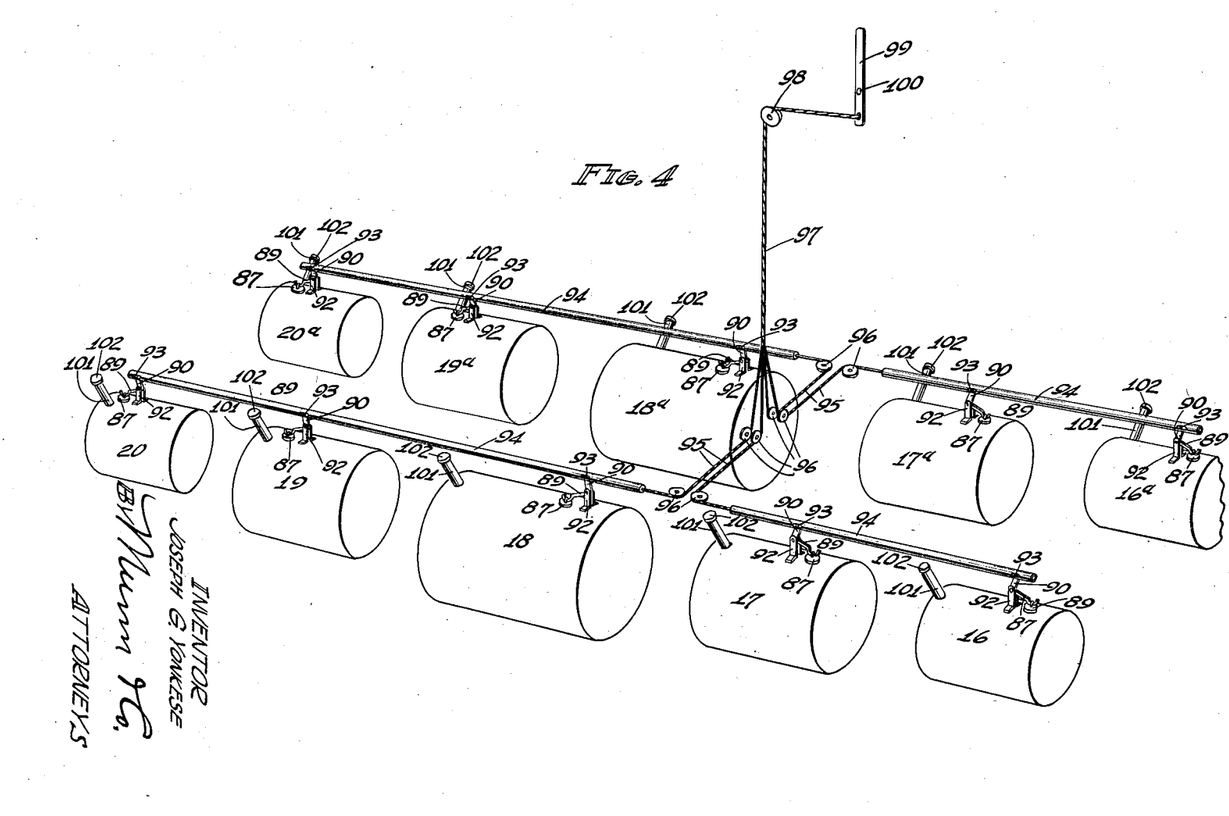
Fig. 4 is a diagrammatic perspective view illustrating a mechanism for controlling the draining of the fuel tanks in an emergency.
Figure 5:
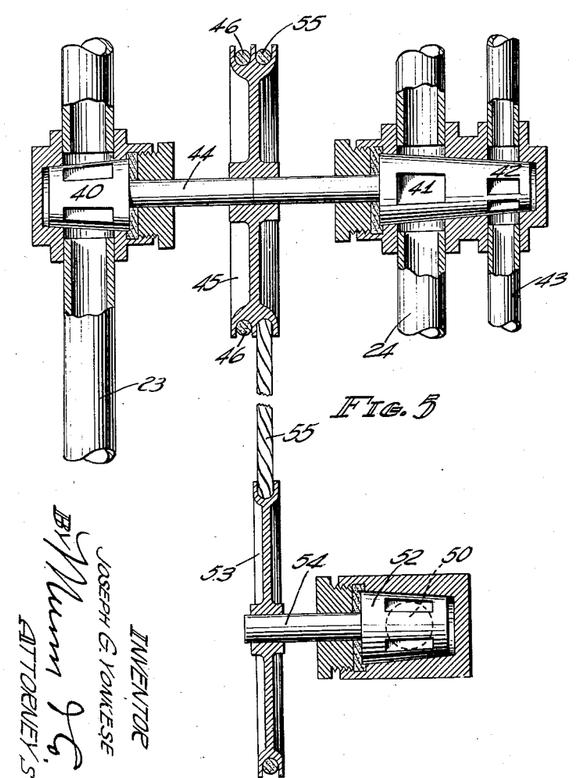
Fig. 5 is a sectional view taken on the line 5—5 of Fig. 3 and illustrating in detail the construction and arrangement of certain control valves embodied in my invention.
Figure 6:
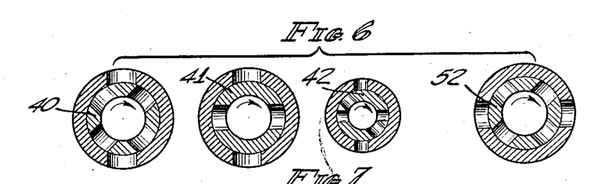
Figs. 6, 7, and 8 are diagrammatic views illustrating the different positions occupied by the various valves shown in Fig. 5.

The drain valves 73 of all of the two rows of storage tanks are adapted to be manually moved simultaneously to open position from a point convenient to the pilot in the cockpit 13, and by reference to Fig. 4 it will be seen that the bell crank levers 90 have pin and slot connections 93 with rod sections 94 connected to cables 95 trained over suitable idler pulleys 96 so arranged and supported that the cables will extend upwardly into the hollow mast 14 where they are all connected to a master cable 97 trained over an idler pulley 98 in the cockpit 13 and connected to an actuating lever 99 pivoted at 100 in the cockpit.

When it is desired to drain the fuel from all the tanks so that the tanks can be utilized as buoyant bodies to sustain the craft afloat in a body of water in an emergency, it is only necessary for the pilot to actuate the single lever 99 to cause all of the bell crank levers 90 to be rocked from the position shown in Fig. 11 to that shown in Fig. 12, and thus cause all of the drain valves 73 to be opened. The fuel is now free to drain from the tanks into their respective spouts 71, and although the check valves 76 are normally urged to closed position, their springs 80 are sufficiently light in tension to be ineffective to retain the check valves closed against the pressure and weight of fuel draining from the tanks, so that the check valves will be opened and thus permit the fuel to drain from the spouts 71 and hence from the pontoon 15. When the fuel has drained from the tanks, the check valves will automatically close, to thus seal the tanks against the admission of water when the craft has landed thereon, so that the tanks will act as buoyant bodies to aid in maintaining the craft afloat indefinitely. It will be clear that as the valves 73 are opened, the caps 87 will be simultaneously disengaged from their respective seats 88 so as to permit the rapid entrance of air into the tanks through the air ports 88ᵃ, to replace the fuel discharging from the tanks, thus preventing the formation of a vacuum in the tanks above the fuel therein with the consequent retarding of the flow of fuel.

Each of the storage tanks is provided with a filling spout 101 opening to the top of the pontoon and normally closed by a cap 102, so that upon removal of the cap, filling of the tanks at a source of fuel supply, can be effected.

Although I have herein shown and described only one form of fuel supply and balancing system for aircraft embodying my invention, it is to be understood that various changes and modifications may be made therein without departing from the spirit of the invention and the spirit and scope of the appended claims.

I claim:

1. An aircraft having means in which fuel for its power plant is adapted to be stored, means by which fuel in the first means can be drained therefrom and automatic means for sealing the first means when the fuel has been drained therefrom, so that the buoyancy of the first means can be utilized to maintain the aircraft afloat.

2. A hydroairplane having a pontoon by which it is rendered capable of landing and floating on a body of water, means in the pontoon in which fuel for the power plant of the airplane is adapted to be stored, means by which fuel in the first means can be drained therefrom, and automatic means for sealing the first means against the admission of water when the fuel has been drained therefrom, so that the first means will act as a buoyant body to maintain the airplane afloat.

3. A hydroairplane having a pontoon by which it is rendered capable of landing and floating on a body of water, a plurality of fuel tanks in the pontoon, means by which fuel can be rapidly drained from all the tanks, and automatic means for each of the tanks for sealing the latter against the admission of water so that the tanks will act as buoyant bodies to maintain the airplane afloat.

4. A hydroairplane having a buoyant body by which it is rendered capable of landing and floating on a body of water, a tank in the body in which fuel for the power plant of the airplane is adapted to be stored, a drain valve for the tank, means for opening the valve so that fuel in the tank will be free to drain therefrom, and automatic means for sealing the tank against the admission of water so that with the tank empty of fuel, its buoyancy can be utilized as an aid in maintaining the airplane afloat.

5. A hydroairplane having a buoyant body by which it is rendered capable of landing and floating on a body of water, a tank in the body in which fuel for the power plant of the airplane is adapted to be stored, a drain valve for the tank normally urged to closed position, manually operable means for moving the valve to open position, a drain spout for the tank discharging from said body, through which fuel draining from the tank when the drain valve is open, is adapted to pass, and a check valve in the spout, opening outwardly of the tank and normally urged to closed position yet opening under the weight of fuel draining from the tank so that the fuel will be free to discharge from the spout.

6. A hydroairplane having a buoyant body by which it is rendered capable of landing and floating on a body of water, a plurality of tanks in the body in which fuel is adapted to be stored, and means by which fuel in the tanks can be drained therefrom and out of the body, and the tanks automatically sealed against the admission of water so that the tanks will act as buoyant bodies to maintain the airplane afloat.

7. A hydroairplane having a buoyant body by which it is rendered capable of landing and floating on a body of water, a plurality of tanks in the body in which fuel is adapted to be stored, and means by which fuel in the tanks can be drained therefrom and out of the body, and the tanks sealed against the admission of water so that the tanks will act as buoyant bodies to maintain the airplane afloat, said means comprising drain valves, one for each of the tanks, normally urged to closed position, manually operable means for moving the valves to open position, drain spouts on the tanks through which fuel draining from the latter is adapted to discharge from the body when the drain valves are opened, and check valves in the spouts, opening outwardly of the tanks and yieldably urged to closed position to seal the tanks against the admission of water, yet opening under the pressure of fuel draining from the tanks so that the fuel is free to discharge from the spouts.

8. In an aircraft, a tank adapted to contain fuel and having its bottom wall provided with a drain opening, a drain valve normally closing the opening, manually operable means for opening the valve, and a check valve opening outwardly of the tank and normally urged to a closed position to seal the tank against the admission of water through said opening, yet yielding to the pressure of fuel when draining from the tank through said opening so as to be opened by the fuel and thereby render the latter free to discharge from the tank.

9. In an aircraft, a tank adapted to contain fuel and having its bottom wall provided with a drain opening, a drain valve normally closing the opening, manually operable means for opening the valve, a drain spout surrounding the drain opening, and a check valve in the spout, opening outwardly of the tank and normally urged to closed position.

10. In an aircraft, a tank adapted to contain fuel and having openings in its top and bottom, a housing insertable into the tank through said top opening and having a valve chamber therein communicating with the interior of the tank, means for securing the housing to the bottom of the tank in surrounding relation to said bottom opening, means for securing the upper end of the housing to the top of the tank in closing relation to the top opening, a drain valve mounted in the valve chamber and normally urged to close said bottom opening, and means operable from a point exteriorly of the tank and operatively connected to the drain valve for moving the latter to open position so that fuel in the tank will be free to drain therefrom through said bottom opening.

11. In an aircraft, a tank adapted to contain fuel and having openings in its top and bottom, a housing insertable into the tank through said top opening and having a valve chamber therein communicating with the interior of the tank, means for securing the housing to the bottom of the tank in surrounding relation to said bottom opening, means for securing the upper end of the housing to the top of the tank in closing relation to the top opening, a drain valve mounted in the valve chamber and normally urged to close said bottom opening, and means operable from a point exteriorly of the tank and operatively connected to the drain valve for moving the latter to open position, a drain spout secured to the bottom of the tank in surrounding relation to said bottom opening, and a check valve in the drain spout opening outwardly of the tank and normally urged to closed position yet opening in response to the pressure of fuel in the tank acting on the check valve when the drain valve is opened so that the fuel will be free to drain from the tank.

12. The combination as embodied in claim 10 wherein said last means comprises a stem fixed to the valve, a pair of rod sections having a lost motion operative connection therebetween to permit a limited relative longitudinal movement of the sections, one of the sections being connected to the stem, a bell crank lever mounted on the upper portion of the housing exteriorly of the tank and operatively connected to the other of the sections, and means for actuating the lever to open the valve from a remote point.

13. In an aircraft, a tank adapted to contain fuel and having openings in its bottom and top, a housing insertable into the tank through said top opening and comprising an inverted cup shaped portion constituting a valve chamber communicating with the interior of the tank, a flange on said cup shaped portion surrounding said bottom opening and secured to the tank, a tubular extension projecting from said cup shaped portion and having a flange secured to the tank in closing relation to said top opening, a valve in the valve chamber having a stem slidably mounted in the housing and projecting into said tubular extension, a spring for urging the valve to close the bottom opening, and means operatively connected to the stem and operable from a point exteriorly of the tank for moving the valve to open position.

14. In an aircraft, a tank adapted to contain fuel and having openings in its bottom and top, a housing insertable into the tank through said top opening and comprising an inverted cup shaped portion constituting a valve chamber communicating with the interior of the tank, a flange on said cup shaped portion surrounding said bottom opening and secured to the tank, a tubular extension projecting from said cup shaped portion and having a flange secured to the tank in closing relation to said top opening, a valve in the valve chamber having a stem slidably mounted in the housing and projecting into said tubular extension, a spout exteriorly of the tank and secured thereto in surrounding relation to said bottom opening, the spout having a pair of valve seats therein, a spring for normally urging said valve into engagement with one of said seats to close said bottom opening, means operatively connected to said stem and operable from a point exteriorly of the tank for disengaging the valve from its seat, and a check valve in the spout opening outwardly of the spout and normally urged into engagement with the other of said seats.

15. In an aircraft, a plurality of tanks in which fuel is adapted to be stored, a feed conduit communicating with the tanks, a return conduit communicating with the tanks, means for withdrawing fuel from the tanks through the feed conduit and delivering the fuel into the return conduit, and valved means for each of the tanks by which the feed and return conduits can be placed in or out of communication with the respective tanks, all in such manner that fuel can be withdrawn by the first means from any one of the tanks into the feed conduit and returned to any other tank through the return conduit, whereby fuel can be transferred from one tank to another for the purpose described.

16. In an aircraft, a plurality of tanks in which fuel is adapted to be stored, a feed conduit, a return conduit, distributing conduits for connecting the feed and return conduits to each of the tanks, means for withdrawing fuel from the tanks into the feed conduit through its distributing conduits, and valves in the distributing conduits by which the feed conduit can be placed in communication with any one of the tanks to the exclusion of the others, and the return conduit placed in communication with any of the tanks except that one in communication with the feed conduit, whereby fuel can be withdrawn from any one tank and transferred to another.

17. In an aircraft, a plurality of tanks in which fuel is adapted to be stored, a feed conduit, a return conduit, distributing conduits for connecting the feed and return conduits to each of the tanks, means for withdrawing fuel from the tanks into the feed conduit through its distributing conduits, valves in the distributing conduits by which the feed conduit can be placed in communication with any one of the tanks to the exclusion of the others, and the return conduit placed in communication with any of the tanks except that one in communication with the feed conduit, whereby fuel can be withdrawn from any one tank and transferred to another, and means by which the valves in the distributing conduits for any one tank can be operated from a remote point, independently of the valves in the distributing lines for the remaining tanks.

18. In an aircraft, a plurality of tanks in which fuel is adapted to be stored, a feed conduit, a return conduit, distributing conduits for connecting the feed and return conduits to each of the tanks, means for withdrawing fuel from the tanks into the feed conduit through its distributing conduits and delivering the fuel to the return conduit and its distributing conduits, and valved means in the distributing conduits by which any one of the tanks can be placed in communication with the feed conduit and any other of the tanks placed in communication with the return conduit, whereby fuel can be withdrawn from any of the tanks and transferred to others.

19. In an aircraft, a plurality of tanks in which fuel is adapted to be stored, a feed conduit, a return conduit, distributing conduits for connecting the feed and return conduits to each of the tanks, a pump for withdrawing fuel from the tanks into the feed conduit through its distributing conduits and delivering the fuel to the return conduit and its distributing conduits, valved means in the distributing conduits by which any one of the tanks can be placed in communication with the feed conduit and any other of the tanks placed in communication with the return conduit, whereby fuel can be withdrawn from any of the tanks and transferred to others, and means by which said valves for controlling the feed and return of fuel to any one tank can be operated from a remote point independently of the valves for controlling the feed and return of fuel to the remaining tanks.

20. The combination as embodied in claim 16 including a relief valve between the pump and return conduit, normally closed to prevent the delivery of fuel by the pump, from the feed conduit to the return conduit, and movable to open position in response to a predetermined pressure of fuel in the feed conduit so that the fuel will be free to discharge into the return conduit.

21. In an aircraft, a plurality of tanks in which fuel is adapted to be stored, gravity tank disposed at a point above the storage tank, a feed conduit in communication with the storage tanks and gravity tank and having a branch through which fuel is adapted to be supplied to a prime mover, a pump for withdrawing fuel from the storage tanks and by which the fuel is adapted to be forced into the gravity tank through the feed conduit and into said branch of the feed conduit to supply the prime mover with fuel, a return conduit communicating with the storage tanks and with the feed conduit between the pump and gravity tank, a relief valve between the pump and return conduit normally closed to prevent the delivery of fuel by the pump from the feed conduit to the return conduit, and opening in response to a predetermined pressure of fuel built up in the feed conduit by the pump so that fuel will be free to discharge into the return conduit, and valves for controlling the withdrawal and return of fuel to the tanks through the feed and return conduits respectively, by which fuel can be withdrawn by the pump from any one of the storage tanks to the exclusion of the others, and fuel which is discharged into the return conduit, returned to any of the storage tanks except those from which the fuel is being withdrawn.

22. In an aircraft, a plurality of tanks in which fuel is adapted to be stored, a gravity tank disposed at a point above the storage tank, a feed conduit in communication with the storage tanks and gravity tank and having a branch through which fuel is adapted to be supplied to a prime mover, a pump for withdrawing fuel from the storage tanks and by which the fuel is adapted to be forced into the gravity tank through the feed conduit and into said branch of the feed conduit to supply the prime mover with fuel, a return conduit communicating with the storage tanks and with the feed conduit between the pump and gravity tank, a relief valve between the pump and return conduit normally closed to prevent the delivery of fuel by the pump from the feed conduit to the return conduit, and opening in response to a predetermined pressure of fuel built up in the feed conduit by the pump so that fuel will be free to discharge into the return conduit, valves for controlling the withdrawal and return of fuel to the tanks through the feed and return conduits respectively, by which fuel can be withdrawn by the pump from any one of the storage tanks to the exclusion of the others, and fuel which is discharged into the return conduit, returned to any of the storage tanks except those from which the fuel is being withdrawn and means by which the valves for controlling the withdrawal and return of fuel to any one storage tank can be simultaneously operated from a remote point and independently of the valves for controlling the withdrawal and return of fuel to the remaining tanks.

23. In an aircraft, a plurality of tanks in which fuel is adapted to be stored, a feed conduit, distributing conduits leading from the feed conduit to each of the storage tanks, a return conduit, distributing conduits leading from the return conduit to each of the storage tanks, an air vent for each of the storage tanks, a pump for withdrawing fuel from the storage tanks into the feed conduit through its distributing conduits and discharging the fuel into the return conduit and its distributing conduits, a feed control valve in each of the distributing conduits of the feed conduit, a return control valve in each of the distributing conduits of the return conduit, a vent valve for controlling each of the air vents, the feed control valve, return control valve, and vent valve for each tank being operatively connected for movement to one position wherein the feed control valve, return control valve, and vent valve are closed, a second position wherein the feed control valve is open, the return control valve closed and the vent valve open, and a third position wherein the feed control valve is closed, the return control valve open and the vent valve open.

24. The combination as embodied in claim 23 wherein by-pass conduits are provided through which fuel can be by-passed from one tank to another, and a by-pass valve in each of the by-pass conduits, each of the by-pass valves being operatively connected to the feed control valve, return control valve, and vent valve of a tank for movement to a closed position when said valves occupy their first mentioned positions, an open position when said valves occupy their second mentioned positions, and a closed position when said valves occupy their third mentioned positions.

25. The combination as embodied in claim 23 wherein by-pass conduits are provided through which fuel can be by-passed from one tank to another, a by-pass valve in each of the by-pass conduits, each of the by-pass valves being operatively connected to the feed control valve, return control valve, and vent valve of a tank for movement to a closed position when said valves occupy their first mentioned positions, an open position when said valves occupy their second mentioned positions, and a closed position when said valves occupy their third mentioned positions, and means by which the feed control valve, return control valve, and vent valve for any one tank and one of the by-pass valves can be simultaneously operated from a remote point and independently of said valves for any other tank and of the other by-pass valves.

26. The combination as embodied in claim 23 wherein by-pass conduits are provided through which fuel can be by-passed from one tank to another, a by-pass valve in each of the by-pass conduits, each of the by-pass valves being operatively connected to the feed control valve, return control valve, and vent valve of a tank for movement to a closed position when said valves occupy their first mentioned positions, an open position when said valves occupy their second mentioned positions, and a closed position when said valves occupy their third mentioned positions, said storage tanks being disposed at different levels so that when a by-pass valve is open fuel in one tank will be free to discharge therefrom by gravity through the respective by-pass conduit into a lower tank.

27. The combination as embodied in claim 21 wherein the tanks are disposed at different levels, and means is provided by which fuel can be by-passed under the action of gravity from one tank to a lower tank.

28. The combination as embodied in claim 21 wherein the tanks are disposed at different levels, and valve controlled conduits are provided between the tanks through which fuel can be by-passed from one tank to another.

29. In an aircraft, a tank adapted to contain fuel and having a drain opening, a valve for controlling the drain opening, and automatic means for sealing the drain opening against the admission of water therethrough into the tank when the fuel has been drained from the latter.

30. In an aircraft, a tank adapted to contain fuel and having a drain opening, a valve for controlling the drain opening, and means normally sealing the drain opening, yet yielding to the pressure of fuel when draining from the tank so as to permit the draining of the fuel.

31. In an aircraft, a tank adapted to contain fuel and having a drain opening and an air vent, valves normally urged to close the drain opening and air vent, and means for opening the valves concurrently.

32. In an aircraft, a plurality of tanks in which fuel is adapted to be stored, a feed conduit, a return conduit, means for withdrawing fuel from the tanks through the feed conduit and delivering the fuel to the return conduit, and means by which the feed and return conduits can be placed in or out of communication with the respective tanks, all in such manner that fuel can be withdrawn by the first means from any one of the tanks into the feed conduit and returned to any other tank through the return conduit.

33. In an aircraft, a plurality of tanks in which fuel is adapted to be stored, a feed conduit, a return conduit, means for withdrawing fuel from the tanks through the feed conduit and delivering the fuel to the return conduit, means by which the feed conduit can be placed in communication with any of the tanks to the exclusion of others, and means by which the return conduit can be placed in communication with any of the tanks to the exclusion of those tanks in communication with the feed conduit.

34. In an aircraft, a tank in which fuel is adapted to be stored, and having a fuel inlet, a fuel outlet and an air vent, a feed control valve for the outlet, a return control valve for the inlet, a vent valve for the air vent, and means for operating the valves to effect movement thereof to one position wherein the valves are closed, a second position wherein the feed control valve is open, the return control valve closed and the vent valve open, and a third position wherein the feed control valve is closed and the return control and vent valves open.

Signed at Los Angeles, in the county of Los Angeles and State of California, this 9th day of March, A. D. 1928.

JOSEPH G. YONKESE.